United States Patent
Zhang et al.

(10) Patent No.: US 12,373,263 B2
(45) Date of Patent: Jul. 29, 2025

(54) DYNAMIC DATABASE OBJECT DESCRIPTION ADJUSTMENT

(71) Applicant: International Business Machines Corporation, Armonk, NY (US)

(72) Inventors: Hong Mei Zhang, Beijing (CN); Shuo Li, Beijing (CN); Xiaobo Wang, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 17/454,968

(22) Filed: Nov. 15, 2021

(65) Prior Publication Data

US 2023/0153173 A1  May 18, 2023

(51) Int. Cl.
*G06F 9/46* (2006.01)
*G06F 9/50* (2006.01)

(52) U.S. Cl.
CPC .......... *G06F 9/5083* (2013.01); *G06F 9/5033* (2013.01); *G06F 9/5038* (2013.01); *G06F 2209/5022* (2013.01); *G06F 2209/503* (2013.01)

(58) Field of Classification Search
CPC .... G06F 9/5083; G06F 9/5033; G06F 9/5038; G06F 2209/5022; G06F 2209/503; G06F 16/182; G06F 16/2282; G06F 16/289; H04L 67/025; H04L 67/2282; H04L 67/1097; H04L 67/52; H04L 67/535
See application file for complete search history.

(56) References Cited

U.S. PATENT DOCUMENTS

| | | | |
|---|---|---|---|
| 5,440,692 A | 8/1995 | Janicek | |
| 5,619,713 A * | 4/1997 | Baum | G06F 16/284 707/999.102 |
| 6,175,837 B1 | 1/2001 | Sharma et al. | |
| 8,370,312 B1 * | 2/2013 | Sawhney | H04L 67/1001 707/694 |
| 10,140,334 B2 * | 11/2018 | Dickie | G06F 16/244 |
| 11,853,273 B1 * | 12/2023 | Stephan | H04L 67/56 |

(Continued)

FOREIGN PATENT DOCUMENTS

| CN | 1588369 A | 3/2005 |
|---|---|---|
| CN | 109684282 A | 4/2019 |

(Continued)

OTHER PUBLICATIONS

Microsoft Computer Dictionary, 2002, Microsoft Press, 5th ed, p. 41 (Year: 2002).*

(Continued)

*Primary Examiner* — April Y Blair
*Assistant Examiner* — Zhi Chen
(74) *Attorney, Agent, or Firm* — Yee & Associates, P.C.

(57) ABSTRACT

A computer implemented method manages a location of database object descriptions in a storage, the computer implemented method. A number of processor units identifies a set of workload groups that are coming up for execution. The number of processor units loads the database object descriptions for the set of workload groups into a highest performance storage in a storage system. The number of processor units manages the location of the database object descriptions in the storage system based on access to database objects by set of workload groups.

20 Claims, 9 Drawing Sheets

(56) References Cited

U.S. PATENT DOCUMENTS

| | | | |
|---|---|---|---|
| 12,189,521 B1 * | 1/2025 | Cousins | G06F 3/0643 |
| 2013/0212349 A1 * | 8/2013 | Maruyama | G06F 11/3452 |
| | | | 711/167 |
| 2014/0195750 A1 | 7/2014 | Zhang et al. | |
| 2016/0342647 A1 * | 11/2016 | Welton | G06F 16/24532 |
| 2019/0018597 A1 * | 1/2019 | Zhang | G06F 3/0611 |
| 2019/0057090 A1 | 2/2019 | Xie et al. | |
| 2019/0243559 A1 * | 8/2019 | Raut | G06F 3/0604 |

FOREIGN PATENT DOCUMENTS

| | | | | |
|---|---|---|---|---|
| WO | WO-2004077215 A2 * | 9/2004 | | G06F 17/303 |
| WO | WO-2016107442 A1 * | 7/2016 | | G06F 3/06 |
| WO | 2023/083114 A1 | 5/2023 | | |

OTHER PUBLICATIONS

Catterall, "An Oft-Overlooked DB2 for z/OS Big Memory Exploitation Play," 2015, 3 pages.

Xu et al., "Configuring Buffer Pools in DB2 UDB," CASCON, 2002, 12 pages.

"Method for Improved Inter-Tier Migration Management with NVMe Drives," 2021, 9 pages.

PCT International Search Report and Written Opinion, dated Jan. 28, 2023, regarding Application No. PCT/CN2022/129871, 9 pages.

\* cited by examiner

DYNAMIC DATABASE OBJECT DESCRIPTION ADJUSTMENT

BACKGROUND

1. Field

The disclosure relates generally to improved computer system and more specifically to a computer system that dynamically manages the storage of database object descriptions for database objects.

2. Description of the Related Art

Databases are commonly searched to obtain information about various topics. For example, users may search for information about a type of car, a company, or some other information using a search engine. Searches can also be performed to obtain files such as those for the documents, spreadsheets, images, videos, or other type of files. Users may also perform searches as part of a process to purchase goods or services.

These searches involve client applications sending search queries to a database management system. The database management system performs searches a database using the search queries and returns search results to the client applications. Database performance can be measured as a rate at which a database management system sends information to users. Factors such as workloads, throughput, processing resources, and optimizations can affect the performance of the database management system.

In processing search queries, information from environmental descriptor manager (EDM) pools can be used in processing workloads to return information to a client application. An environmental descriptor manager pool contains skeleton application plans and packages, database descriptors, and cached dynamic sequential query language (SQL) statement in storage. Each of these types of information can be in a separate storage area in an environmental descriptor manager pool. Each database access can access information from the environmental descriptor manager pool. The size of an environmental descriptor manager pool is not limited.

Some of these environmental descriptor manager pools may be stored in disk but not in memory. With this situation, the database management system will load needed information from the environmental descriptor manager pool. This type of access to information processing search query is considered a high-cost operation because of the input/output (I/O) operation involved to obtain the information from the environmental descriptor manager pool. In some cases, some of the information in the environmental descriptor manager pool can be stored in a memory. This type of storage which increases the performance and accessing this information as compared stored information in a disk. However, memory is often more limited than this space. As a result, in some cases information in the environmental descriptor manager pool is still accessed from disk resulting in a lower level of performance Therefore, it would be desirable to have a method and apparatus that take into account at least some of the issues discussed above, as well as other possible issues. For example, it would be desirable to have a method and apparatus that overcome a technical problem with increasing performance in accessing information in a database.

SUMMARY

According to one illustrative embodiment, a computer implemented method manages a location of database object descriptions in a storage, the computer implemented method. A number of processor units identifies a set of workload groups that are coming up for execution. The number of processor units loads the database object descriptions for the set of workload groups into a higher performance storage than a current storage for the database object descriptions in a storage system. The number of processor units manages the location of the database object descriptions in the storage system based on access to database objects by set of workload groups. According to other illustrative embodiments, a computer system and a computer program product for managing a location of database object descriptions in a storage are provided. As a result, the illustrative embodiments can provide a technical effect of increasing the performance in accessing information in a database by dynamically managing the storage location of database object descriptors for database objects in a database.

The illustrative embodiments can permissively manage the location of the database object descriptions in the storage system based on the access to the database object descriptions and space limits in the storage system. As a result, the illustrative embodiments can provide a technical effect of increasing the performance in accessing information in a database by dynamically managing the storage location of database object descriptors taking into account space limits.

The illustrative embodiments can permissively load the database object descriptions into the higher performance storage in the storage system based on an execution order for the set of workload groups that are coming up for execution. As a result, the illustrative embodiments can provide a technical effect of increasing the performance in accessing information in a database by dynamically managing the storage location of database object descriptors using the execution order of the set of workload groups.

The illustrative embodiments can permissively place a number of the database object descriptions from a current storage having a current performance level into a higher performance storage having a higher performance level that is higher than the current performance level in the storage system in response to the access to the database objects described by the number of the database object descriptions increasing above a highly accessed threshold for the database objects. As a result, the illustrative embodiments can provide a technical effect of increasing the performance in accessing information in a database by dynamically managing the storage location of database object descriptors using the execution order of the set of workload groups. The illustrative embodiments can permissively place a number of the database object descriptions from a current storage having a current performance level into a lower performance storage having a lower performance level that is higher than the current performance level in the storage system in response to the access to the database objects described by the number of the database object descriptions decreasing below a lower accessed threshold for the database objects. As a result, the illustrative embodiments can provide a technical effect of increasing the performance in accessing information in a database by dynamically managing the storage location of database object descriptors based on the amount of access to the database objects described by the number of the database object descriptions.

The illustrative embodiments can permissively place the database object descriptions for a set of the database objects into high memory storage in response to a frequency at which the set of the database objects is accessed is above a threshold. As a result, the illustrative embodiments can provide a technical effect of increasing the performance in accessing information in a database by dynamically managing the storage location of database object descriptors based on the frequency at which the database objects are accessed.

The illustrative embodiments can permissively identify a relationship between the set of workload groups and the database objects accessed by the set of workload groups in an execution history for the set of workload groups; identify statistics for the relationship between the set of workload groups and the database objects accessed by the set of workload groups; and create a schedule for the set of workload groups using the statistics, wherein the schedule comprises rules for placing database object descriptions in storage locations having different levels of performance such that a database system in which the workload groups are executed has increased performance. As a result, the illustrative embodiments can provide a technical effect of increasing the performance in accessing information in a database by dynamically managing the storage location of database object descriptors using a schedule created using historical data.

DETAILED DESCRIPTION

Figure 1:
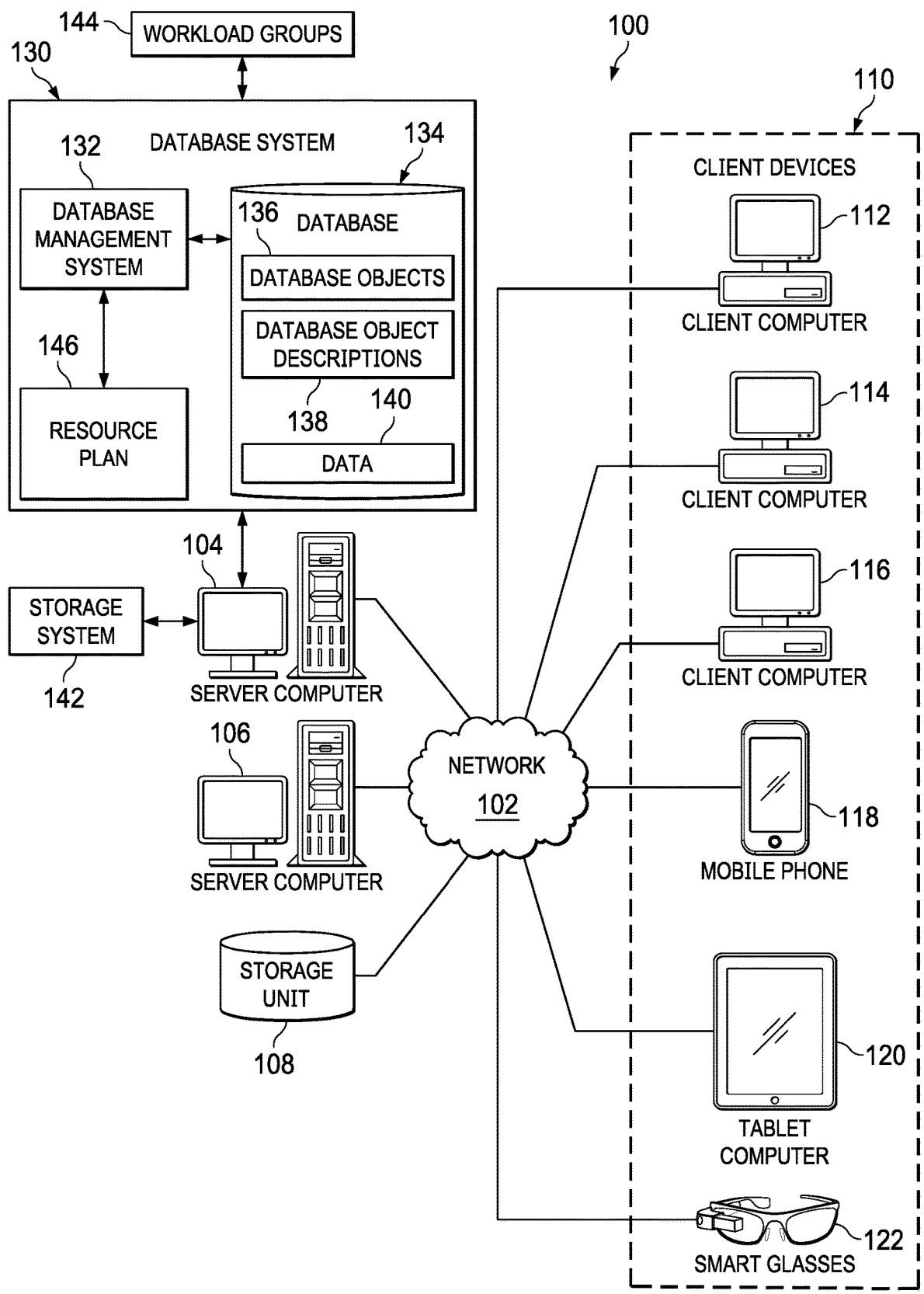
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that information such as database object descriptions are metadata describing database objects. The illustrative embodiments recognize and take into account that the location of this information can affect the performance of a database system.

The illustrative embodiments recognize and take into account accessing to database object descriptions stored on a disk requires input/output operations. The illustrative embodiments recognize and take into account that this type of access takes more time than accessing this information in a memory. The illustrative embodiments recognize and take into account that the amount of memory in particular higher performance memory can be limited.

Thus, the illustrative embodiments provided method, apparatus, system, and computer program product for managing database object descriptions. The management of this type of information can be performed in a manner that increases the performance of the database system. According to one illustrative embodiment, computer implemented method manages a location of database object descriptions in a storage, the computer implemented method. A number of processor units identifies a set of workload groups that are coming up for execution. The number of processor units loads the database object descriptions for the set of workload groups into a higher performance storage than a current storage for the database object descriptions in a storage system. The number of processor units manages the location of the database object descriptions in the storage system based on access to database objects by set of workload groups. According to other illustrative embodiments, a computer system and a computer program product for managing a location of database object descriptions in a storage are provided. As a result, the illustrative embodiments can provide a technical effect of increasing the performance in accessing information in a database by dynamically managing the storage location of database object descriptors for database objects in a database.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, database system 130 is located in server computer 104. Database system 130 comprises database management system 132 and database 134. As depicted, database objects 136, database object descriptions 138, and data 140 are located in database 134.

A database object is a structure in database system 130 that can store data, such as, for example, a table an index, a view, a usage list, or some other type of data structure in database 134. A database object description is metadata that describes a data object. Data 140 is data that can be searched and returned as a search result.

In this illustrative example, database management system 132 manages location of database object descriptions 138 in storage system 142. Storage system 142 can have different storage with different levels of performance. For example, storage system 142 can include a cash, a dynamic random-access memory, and a disk.

Database management system 132 can analyze historical data regarding the execution of workload groups 144 and access of database objects 136 by workload groups 144. Database management system 132 can monitor the access of database objects 136 by workload groups 144 over time. The analysis of this access can be used to determine when database object descriptions 138 for database objects 136 are used. This analysis can be performed by monitoring access to database objects 136 by workload groups 144 during time windows in an order along a timeline.

Database management system 132 can create resource plan 146 for preloading database object descriptions 138. Resource plan 146 can also be used by database management system 132 to manage the location of database object descriptions 138 in storage system 142 in real time during the execution of workload groups 144. Resource plan 146 can include rules that can be triggered by at least one of time, execution order, and access frequency.

Database objects 136 can be preloaded into higher performance locations in storage system 142 during various periods of time for workload groups 144 using resource plan 146. In other words, predictions of when particular workload groups and workload groups 144 will execute can be used to preload database object descriptions 138 that will be needed by workload groups 144 to access database objects 136.

As another example, database object descriptions 138 can be placed into different locations with different levels performance in storage system 142 based on execution order. For example, workload groups 144 that are to be executed next can have database object descriptions 138 loaded into higher performance locations in storage system 142 as compared database object descriptions 138 for to workload groups 144 that are to be executed at a later time.

Further, the access frequency of database objects 136 can be used to load database object descriptions 138 when space is available in locations in storage system 142 with a higher performance. For example, if workload groups 144 are not expected or expected workload groups do not use up higher performance storage in storage system 142, database object descriptions 138 can be placed into locations with higher performance storage based on a frequency of access by workload groups 144. As result, database object descriptions 138 can be loaded or moved to higher performance storage from lower performance storage based on a higher level of access by workload groups 144.

Further, database management system 132 also manages the location of database object descriptions 138 in storage system 142 based on resource plan 146. Different database object descriptions in database object descriptions 138 can be moved upwards or downwards in locations for different performance storage based on the expected use of database object descriptions 138 and the availability of storage locations with different levels of performance.

In other words, upcoming workloads can be identified in resource plan 146 in used to preload database object descriptions 138 for those workloads into higher performance storage. For example, preloaded database object descriptions can be placed into a cache from a disc. As database object descriptions 138 are expected to be accessed at lower levels, those database object descriptions can be moved into lower performance storage in storage system 142 such as from a cache memory into dynamic random-access memory (RAM).

Further, database management system 132 can monitor the access of database objects 136 and database object description 138. This monitoring can be used to update or just resource plan 146. As a result, database management system 132 can increase the performance in accessing information in database 134 by dynamically managing the storage location of database object descriptions 138 for database objects 136 in database 134.

Figure 2:
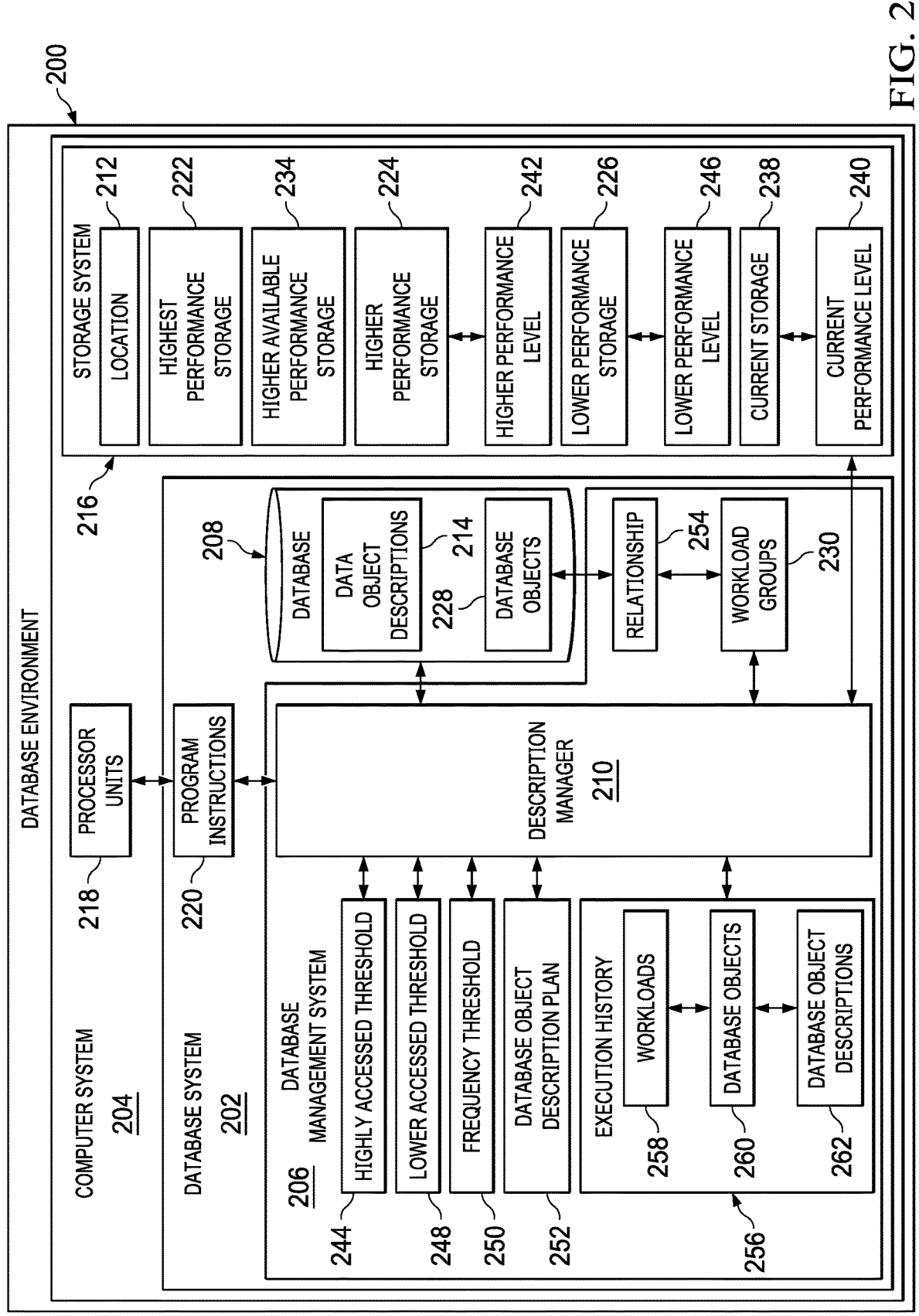
FIG. 2 is a block diagram of a database environment in accordance with an illustrative embodiment.

With reference now to FIG. 2, a block diagram of a database environment is depicted in accordance with an illustrative embodiment. In this illustrative example, database environment 200 includes components that can be implemented in hardware such as the hardware shown in network data processing system 100 in FIG. 1.

In this illustrative example, database system 202 is located in computer system 204. Database system 202 comprises database management system 206 and database 208. As depicted, description manager 210 in database management system 206 can manage location 212 of data object descriptions 214 in storage system 216.

Description manager 210 can be implemented in software, hardware, firmware or a combination thereof. When software is used, the operations performed by description manager 210 can be implemented in program instructions configured to run on hardware, such as a processor unit. When firmware is used, the operations performed by description manager 210 can be implemented in program instructions and data and stored in persistent memory to run on a processor unit. When hardware is employed, the hardware can include circuits that operate to perform the operations in description manager 210.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes a number of processor units 218 that are capable of executing program instructions 220 implementing processes in the illustrative examples. As used herein a processor unit in the number of processor units 218 is a hardware device and is comprised of hardware circuits such as those on an integrated circuit that respond and process instructions and program code that operate a computer. When a number of processor units 218 execute program instructions 220 for a process, the number of processor units 218 is one or more processor units that can be on the same computer or on different computers. In other words, the process can be distributed between processor units on the same or different computers in a computer system. Further, the number of processor units 218 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, storage system 216 is a physical storage system and can comprise one or more storage types of storage with different levels of performance. For example, storage system 216 can comprise highest performance storage 222, higher performance storage 224, and lower performance storage 226. Higher performance storage 224 has a higher level of performance as compared to lower performance storage 226. In some cases, higher performance storage 224 can be highest performance storage 222. The illustrative example, highest performance storage 222 can be, for example, a cache memory. Higher performance of storage 224 can be a random-access memory or a memory pool, and lower performance storage 226 can be a disk. In other illustrative examples, additional levels of performance can be present. For example, different types of lower performance storage 226 can be present such as a hard disk drive and a solid-state disk drive with the hard disk drive having a lower level performance than the solid-state disk drive. Solid-state disk drive has a lower level performance than random-access memory or cache memory.

The level performance can be the access time or time needed to return data in response to a request for data such as data object descriptions 214 in storage system 216. In this illustrative example, the data comprises data object descriptions 214.

Database object descriptions 214 in database 208 are metadata describing database objects 228 in database 208. In other words, a data object description can describe characteristics of database objects 228. For example, for a data object in the form of a table, the data object description can describe characteristics such as table size, number of columns, number of rows, column identifiers, data type, or other characteristics of the table.

A database object in database objects 228 can be any defined object in database 208 that is used to store or reference data. For example, a database object can be one of a table, a constraint, index, a sequence, a view, a trigger, a usage list, or some other suitable type of object in database 208.

In this illustrative example, description manager 210 can identify a set of workload groups 230 that are coming up for execution. A workload group is one or more workloads. A workload can be a set of requests that have common characteristics such as a program, source of requests, type of query, priority, or performance objective. For example, a workload can be access requests that are grouped by programs. In other words, each workload can be associated with a particular program. In the illustrative example, a workload group can be workloads that are created by a group of one or more programs that have in order of execution. In this example, a program is a collection of program instructions that can be executed by a number of processor units 218 to perform a specific task. The identification of a workload group can be performed through various mechanisms. For example, one or more programs can be in a workload group in which each program is associated with a group of database objects. Database objects 228 associated with a program are the database objects that the program accesses during execution of the program.

Description manager 210 can load database object descriptions 214 in database 208 for the set of workload groups 230 into higher performance storage 224 than current storage 238 for database object description 214 in storage system 216. The particular database object descriptions loaded by description manager 210 for the set of workload groups 230 can be those database object descriptions that describe database objects 228 that are accessed by the set of workload groups 230.

In one illustrative example, description manager 210 can attempt to load database object descriptions 214 into highest performance storage 222. If sufficient space is unavailable in highest performance storage 222, description manager 210 can load database object descriptions 214 into higher available performance storage 234 in storage system 216 based on execution order 232 for the set of workload groups 230 that are coming up for execution. The higher available performance storage 234 is storage having a performance greater than current storage 238 for database object descriptions 214.

In another illustrative example, when insufficient space is present in highest performance storage 222 for loading data object descriptions 214, other data object descriptions in highest performance storage 222 can be potentially moved to lower performance storage 226 to make room for data object descriptions 214. Whether other data object descriptions are moved into lower performance storage 226 can be determined based on a priority between the new data object descriptions being loaded and the current data object descriptions in highest performance storage 222.

Description manager 210 can manage location 212 of database object descriptions 214 in storage system 216 based on access to database objects 228 in database 208 by set of workload groups 230. The management of location 212 for database object descriptions 214 can include moving location 212 for one of more of database object descriptions 214 to obtain a different level of performance. This movement of location 212 can include moving location 212 for a database object description from lower performance storage 226, such as a disk, to higher performance storage 224, such as a random-access memory. The movement can also be from lower performance storage 226 to highest performance storage 222, such as a cache memory. In other illustrative examples, the movement of location 212 can be from highest performance storage 222 to lower performance storage 226.

In managing location 212 of data objects descriptions 214, description manager 210 can manage location 212 of database object descriptions 214 in the storage system based on the access to database object descriptions 214 and space limits 236 in storage system 216. In other words, if insufficient space is present to move a database object description 214 from lower performance storage 226 to higher performance storage 224, the data object description may not be moved. In other illustrative examples, the movement of data object description may depend on a priority tween the data object description in lower performance storage 226 and data object descriptions 214 in higher performance storage 224.

As another example, description manager 210 can manage location 212 by placing a number of the database object descriptions 214 from current storage 238 having a current performance level 240 into higher performance storage 224 having higher performance level 242 that is higher than current performance level 240 in storage system 216. This change in location can be performed in response to the access to database objects 228 described by the number of the database object descriptions 214 increasing above highly accessed threshold 244 for database objects 228. As a result, rebalancing of location 212 for database object descriptions 214 in storage system 216 can be performed based on increasing access to database objects 228.

In yet another illustrative example, description manager 210 can place a number of the database object descriptions 214 from current storage 238 having current performance level 240 into lower performance storage 226 having lower performance level 246 that is lower than current performance level 240 in storage system 216. This movement of the number of database object descriptions 214 can be performed in response to the access to database objects 228 described by the number of the database object descriptions 214 decreasing below lower accessed threshold 248 for database objects 228. As a result, rebalancing of location 212 for database object descriptions 214 in storage system 216 can be performed based on decreasing access to database objects 228.

Additionally, description manager 210 can place the database object descriptions 214 for a set of database objects 228 into location 212 in storage system 216 in response to a frequency at which the set of database objects 228 is accessed is above frequency threshold 250.

In the illustrative example, the management of database object descriptions 214 and location 212 in storage system 216 can be performed using database object description plan 252, which includes at least one of rules, schedules, or other guidelines for managing the loading and movement of location 212 for database object descriptions 214 in storage system 216. In this illustrative example, description manager 210 identifies relationship 254 between the set of workload groups 230 and database objects 228 accessed by the set of workload groups 230 in execution history 256 for the set of workload groups 230. In this illustrative example, execution history 256 includes identification of workloads 258 and database objects 260 accessed using workloads 258 in execution history 256. Additionally, execution history 256 can also include database object descriptions 262 for database objects 260. Relationship 254 can be identified based on this information in execution history 256.

Description manager 210 can statistics for relationship 254 between the set of workload groups 230 and database objects 228 accessed by the set of workload groups 230. Description manager 210 creates database object description plan 252 for the set of workload groups 230 using the statistics. In this example, database object description plan 252 comprises rules for placing database object descriptions 214 in storage locations having different levels of performance such that database system 202 in which workload groups 230 are executed has increased performance.

In one illustrative example, one or more technical solutions are present that overcome a technical problem with having a desired level of performance in accessing information in a database. As a result, one or more technical solutions may provide a technical effect of increasing the performance in accessing information in a database by dynamically managing the storage location of database object descriptors using the execution order of the set of workload groups.

Computer system 204 can be configured to perform at least one of the steps, operations, or actions described in the different illustrative examples using software, hardware, firmware or a combination thereof. As a result, computer system 204 operates as a special purpose computer system enables in which description manager 210 in computer system 204 enables preloading database object descriptions based on expected execution of workload groups. Further, description manager 210 in computer system 204 loading or moving database object descriptions based on an order in which workloads are executed during a particular period of time. In particular, description manager 210 transforms computer system 204 into a special purpose computer system as compared to currently available general computer systems that do not have description manager 210.

Figure 3:
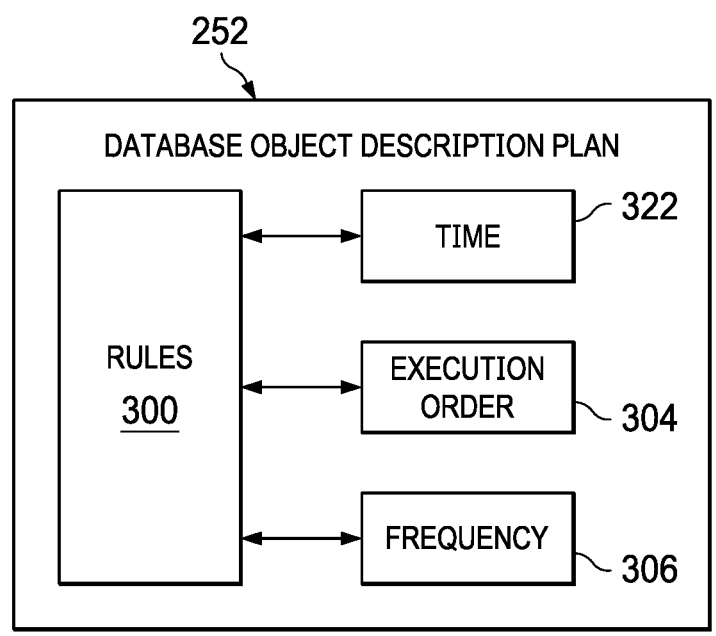
FIG. 3 is a diagram of a database object description plan in accordance with an illustrative embodiment.

With reference now to FIG. 3, a diagram of a database object description plan is depicted in accordance with an illustrative embodiment. In the illustrative examples, the same reference numeral may be used in more than one figure. This reuse of a reference numeral in different figures represents the same element in the different figures.

In this illustrative example, database object description plan 252 comprises rules 300 that have a number of different triggers. For example, rules 300 can be triggered by time 302, execution order 304, and frequency 306.

Rules 300 triggered by time 322 are rules that automatically load database object descriptions 214 based on time periods or time windows that occur. For example, the time window starting at 9:00 am may cause a first set of database object descriptions 214 used by a first workload group to be loaded in higher performance storage 224 such as highest performance storage 222. Another time window starting at 1:00 pm may cause a second set of database object descriptions 214 used by second workload group to be loaded into highest performance storage 222. If the first set of object descriptions are still located in highest performance storage 222, the first set of object descriptions can be moved to lower performance storage 226 if space is not available or both sets of database object descriptions.

In another example, execution order 232 is a trigger in rules 300 that causes the loading of database object descriptions 214 based on order in which workloads are executed in workload groups 230. For example, in execution order workloads can be, for example, workload A, workload C, and workload E. Rule 300 can load database object descriptions 214 for each workload as the workloads are executed. As a result, database object descriptions 214 can be loaded based on an order of execution.

Rule 300 triggered by frequency 306 can load database object descriptions 214 into highest performance storage 222 based on frequency 306 at which database object descriptions 214 are used by workload groups 230. When particular database objects have a frequency of access that is above some selected threshold, database object descriptions 214 for those particular database objects can be loaded into highest performance storage 222 when they are greater than frequency threshold 250.

The illustration of database environment 200 and the different components in FIGS. 2-3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
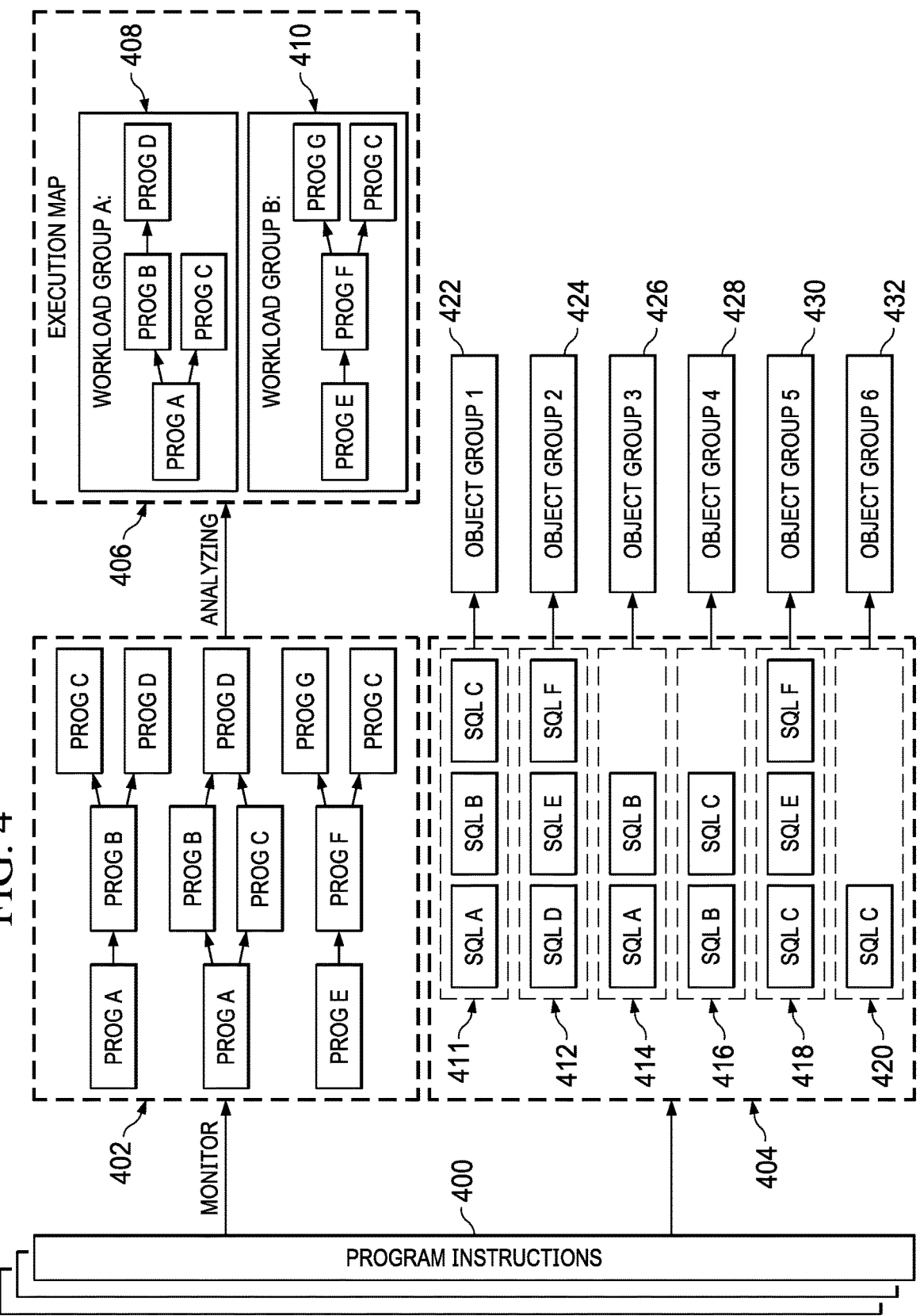
FIG. 4 is a diagram illustrating the identification of relationships between workloads and data object in accordance with an illustrative embodiment.

Turning to FIG. 4, a diagram illustrating the identification of relationships between workloads and data object is depicted in accordance with an illustrative embodiment. In this illustrative example, the program instructions 400 can be executed to run of programs 402 and generate of queries 404. In this illustrative example, queries 404 generated by programs 402 are workloads.

As depicted, the execution program instructions 400 for programs 402 can be monitored. In this illustrative example, programs 402 comprise Prog A, Prog B, Prog C, Prog D, Prog E, Prog F, and Prog G. With this monitoring, and execution order of program 402 and queries 404 can be identified. As depicted, these programs have in order of execution that can be monitored to identify groupings of programs 402. These groupings can be programs that are identified to have an order of execution.

In this illustrative example, execution map 406 can be identified through the analysis of the order in which programs 402 run when executing program instructions 400. In this illustrative example, execution map 406 identifies relationships between the running or execution of programs. The programs that are related to each other with respect execution are placed into workload groups that identify groups of programs and an order of execution of programs in each group of programs As depicted, workload group A 408 and workload group B 410 are identified as groups of programs 402 execute in a particular order to generate workloads. As depicted, workload group A 408 comprises Prog A, Prog B, Prog C, and Prog D. As depicted, the execution order is Prog A with Prog B and Prog C executing in parallel after Prog A and Prog D executing after Prog B. In this example, workload group B 410 comprises Prog E, Prog F, Prog G, and Prog C. The execution order depicted for workload group B is Prog E, Prog F with Prog G and Prog C executing in parallel after Prog F The analysis of queries 404 can be used to identify groups of objects that are accessed by programs 402. In this illustrative example, queries 404 contain groups of queries that excavate in a particular order. As depicted, queries 404 includes query group 412, query group 414, query group 416, query group 418, and query group 420.

As depicted, query group 411 comprises queries SQL A, SQL B, and SQL C in execution order; query group 412 comprises queries SQL D, SQL E, and SQL F in execution order; and query group 414 comprises queries SQL D, SQL E, and SQL F in execution order. Query group 416 comprises queries SQL B and SQL C F in execution order; query group 418 comprises queries SQL C, SQL E, and SQL F in execution order; and query group 420 comprises the query SQL C.

These queries can be analyzed to identify the database objects accessed by the different queries. As depicted, query group 411 accesses database objects in object group 1 422; query group 412 accesses database objects in object group 2 424; query group 414 accesses database objects in object group 3 426; query group 416 accesses database objects in object group 4 428; query group 418 accesses database objects in object group 5 430; and query group 420 accesses database objects in object group 6 432.

Figure 5:
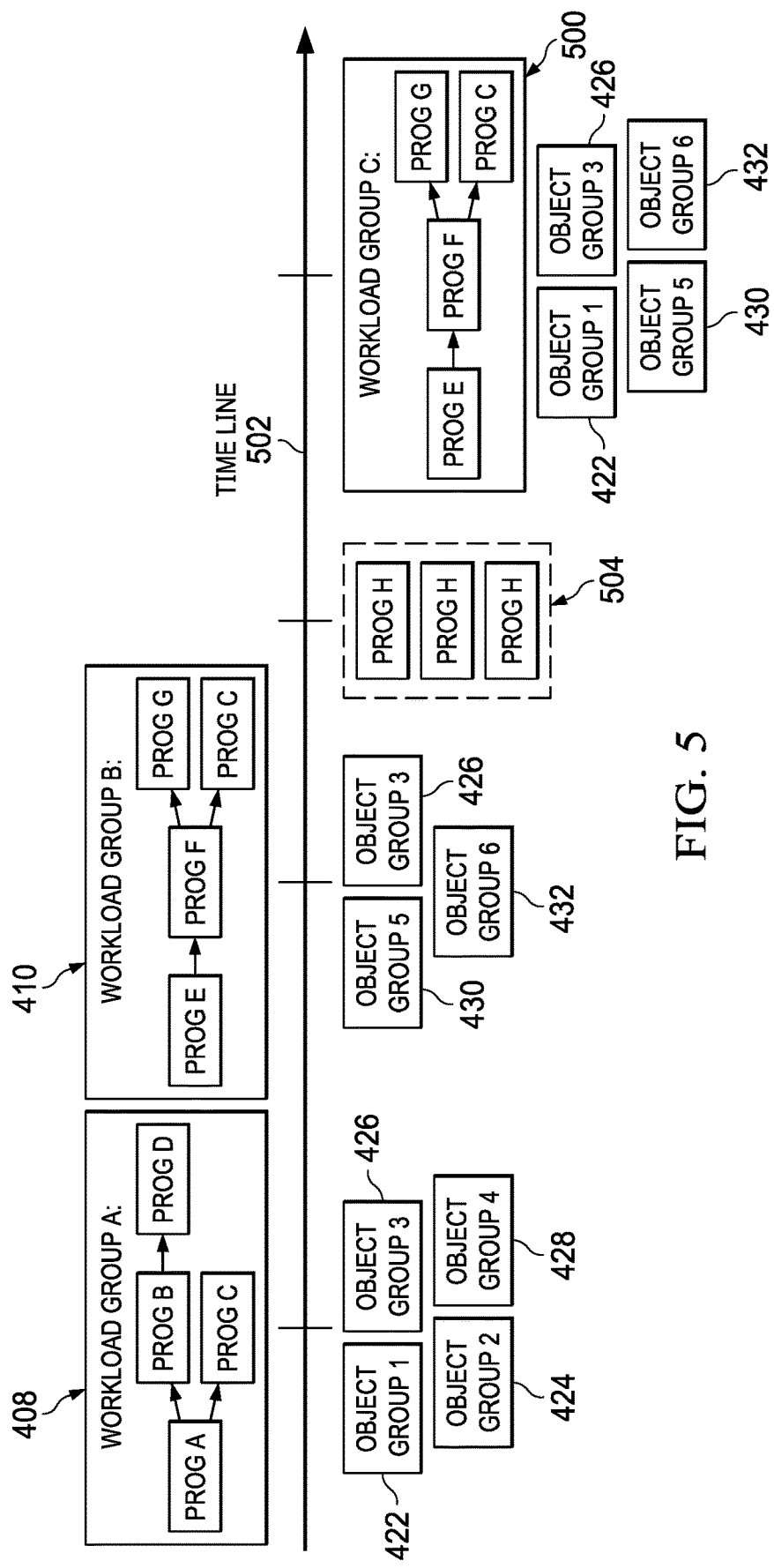
FIG. 5 is an illustration of workload group and data object group access used to generate a database object description plan in accordance with an illustrative embodiment.

With reference to FIG. 5, an illustration of workload group and data object group access used to generate a database object description plan is depicted in accordance with an illustrative embodiment. In this figure, the execution of programs that generate workloads are monitored. The relationship between the execution of programs to generate workloads can be identified to form workload groups. Each workload group contains a number of programs that generate workloads to access database objects. Further, database objects in object groups accessed by the programs in workload groups are also monitored.

In this illustrative example, workload groups such as workload group A 408, workload group B 410, in workload group C 500 are monitored over time as indicated by timeline 502. In this example, other programs 504 can also execute that may not access objects. In this illustrative example, the groups accessed by the workload groups is also monitored on timeline 502.

For example, the programs in workload group A 408 generate workloads that access object group 1 422, object group 2 424, object group 3 426, and object group 4 428. In illustrative this example, programs in workload group B 410 generate workloads that access object group 5 430, object group 6 432, and object group 3 426. As depicted, programs in workload group C 500 generate workloads that access object group 1 422, object group 3 426, object group 5 430, and object group 6 432. This information can be stored as historical data to form an execution history, such as execution history 256 in FIG. 2.

The patterns of workload groups accessing object groups along timeline 502 can be analyzed to predict when particular object groups of database objects will be accessed over time. The analysis can include a statistical analysis to identify trends database object access by workload groups. These trends can be used to predict future trends. In another illustrative example, the execution history of workload groups generating workloads that access object groups can be used as training data to train machine learning model that predicts when particular workload groups will run and the object groups accessed by the workload groups. This prediction of access can be used in generating a database object description plan, such as database object description plan 252 in FIG. 2 containing rules 300 in FIG. 3.

Figure 6:
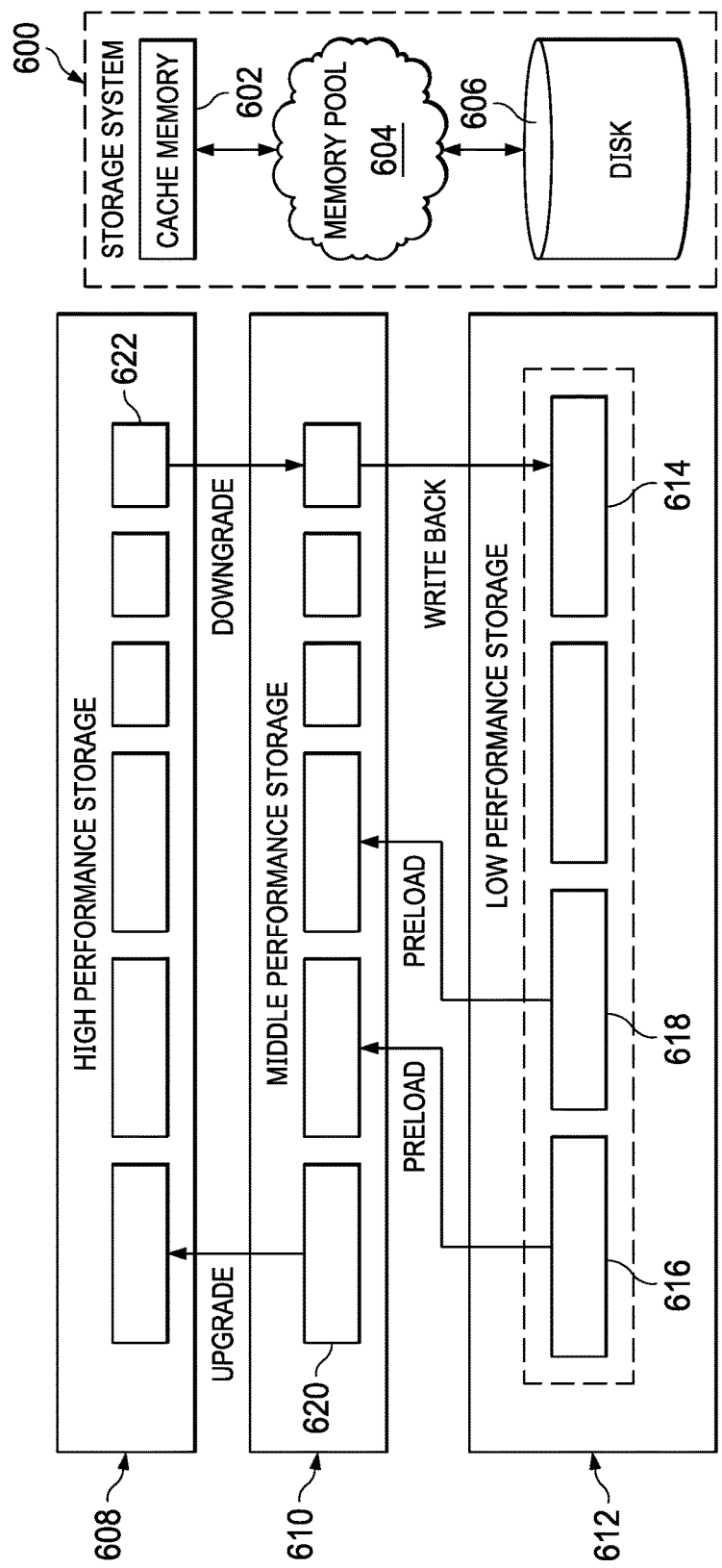
FIG. 6 is an illustration of database description objects in storage in accordance with an illustrative embodiment.

Turning next to FIG. 6, an illustration of database description objects in storage is depicted in accordance with an illustrative embodiment. In this illustrative example, storage system 600 is an example of an implementation for storage system 216 shown in block form FIG. 2.

As depicted, storage system 600 comprises cache memory 602, memory pool 604, and disk 606. In terms of the amount of resources, disk 606 can be considered to have unlimited storage. Memory pool 604 as less storage space than disk 606 but more storage space than cache memory 602.

Further, cache memory 602 is high-performance storage 608, memory pool 604 is middle performance storage 610, and disk 606 is low performance storage 612. In other words, cache memory 602 has the highest level performance while disk 606 has the lowest level of performance in storage system 600.

In this illustrative example, database object descriptors 614 stored in low performance storage 612 in disk 606. Database object descriptors 614 can be preloaded into higher levels of performance using database option description plan, which has rules on where database object descriptions are to be loaded. This plan can also take into account the availability of higher performance storage.

In this illustrative example, database description object 616 and database description objects 618 are preloaded from low performance storage 612 in disk 606 into middle performance storage 610 and memory pool 604. As another example, database description object 620 is moved from middle performance storage 610 in memory pool 604 into high-performance storage 608 in cache memory 602. In this illustrative example, database description object 622 is moved from high-performance storage 608 and cache memory 602 into middle performance storage 610 in memory pool 604. In another example, database description object 622 can be downgraded from high-performance storage 608 to middle performance storage 610 and eventually written back into low performance storage 612.

Figure 7:
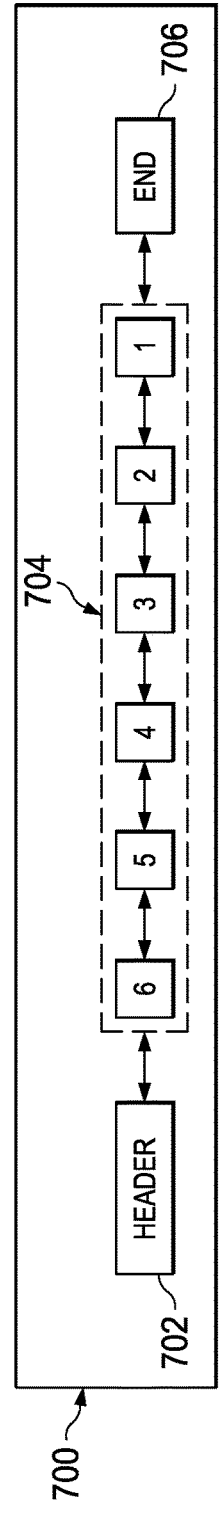
FIG. 7 is a linked list used to manage database object descriptors in accordance with an illustrative embodiment.

With reference now to FIG. 7, a linked list used to manage database object descriptors is depicted in accordance with an illustrative embodiment. In this illustrative example, linked list 700 can be used to determine which database object descriptors are to be removed from a storage in a storage system. For example, linked list 700 can be used with cache memory 602 and memory pool 604 to determine what database object descriptors can be removed when object database descriptors are to be placed into memory and space is unavailable.

As depicted, linked list 700 has header 702, entries 704, and end 706. Each time a database object descriptor placed into a storage, an entry in entries 704 is made at the beginning of the linked list at header 702. If a database object descriptor needs to be removed from storage to make room for adding another database object descriptor, the database object descriptor for removal can be identified as the last entry in entries 704 at end 706. As a result, linked list 700 can be used to track how recent particular database object descriptions are within a storage.

Figure 8:
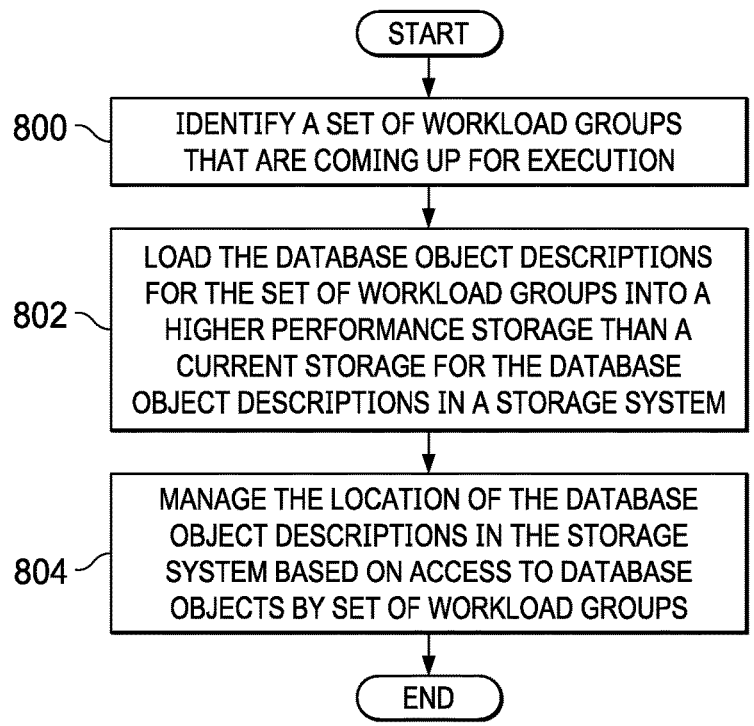
FIG. 8 is a flowchart of a process for managing location of database object descriptions in a storage in accordance with an illustrative embodiment.

Turning next to FIG. 8, a flowchart of a process for managing location of database object descriptions in a storage is depicted in accordance with an illustrative embodiment. The process in FIG. 8 can be implemented in hardware, software, or both. When implemented in software, the process can take the form of program instructions that is run by one of more processor units located in one or more hardware devices in one or more computer systems. For example, the process can be implemented in description manager 210 in computer system 204 in FIG. 2.

The process begins by identifying a set of workload groups that are coming up for execution (step 800). The process loads the database object descriptions for the set of workload groups into a higher performance storage than a current storage for the database object descriptions in a storage system (step 802).

The process manages the location of the database object descriptions in the storage system based on access to database objects by set of workload groups (step 804). The process terminates thereafter.

Figure 9:
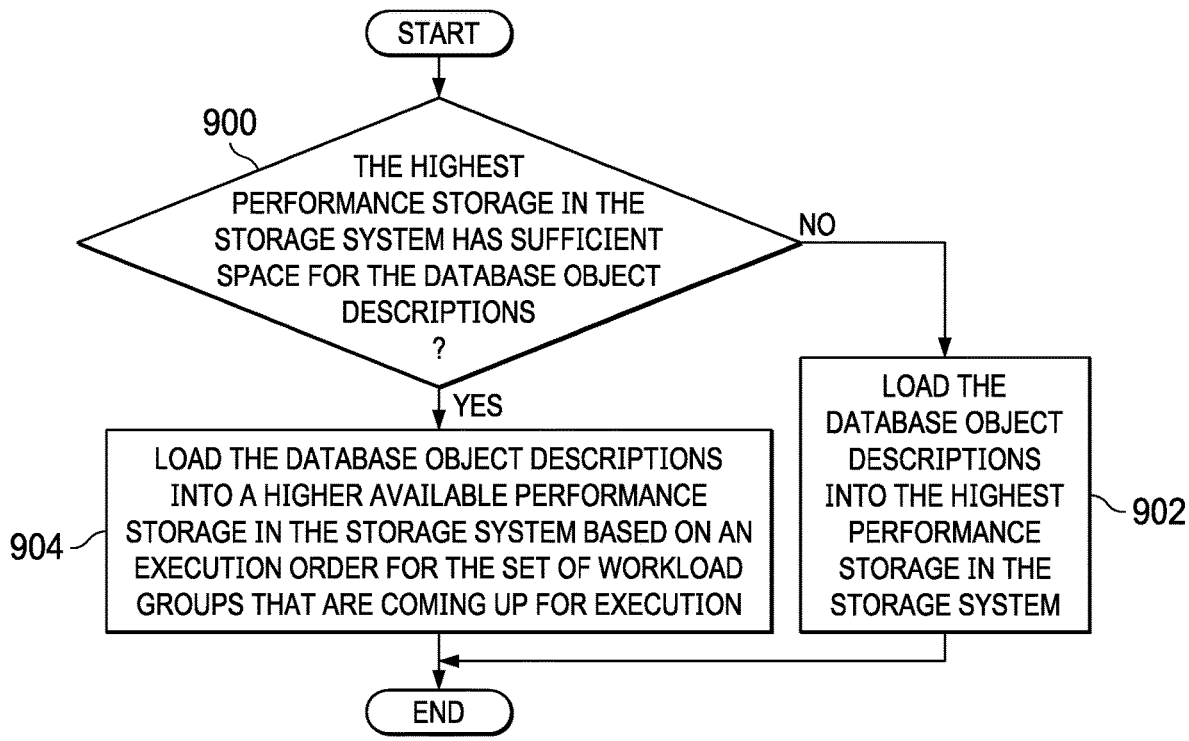
FIG. 9 is a flowchart of a process for loading database object descriptions in accordance with an illustrative embodiment.

With reference to FIG. 9, a flowchart of a process for loading database object descriptions is depicted in accordance with an illustrative embodiment. The process illustrated in this flowchart is an example of an implementation for step 802 in FIG. 8.

The process determines whether the highest performance storage in the storage system has sufficient space for the database object descriptions (step 900). If the highest performance storage has sufficient space, the process loads the database object descriptions into the highest performance storage in the storage system (step 902). The process terminates thereafter.

With reference again to step 900, if the highest performance storage in the storage system does not have sufficient space, the process loads the database object descriptions into a highest available performance storage in the storage system based on an execution order for the set of workload groups that are coming up for execution (step 904). The process terminates thereafter. In step 904, a portion of the database object descriptions may be loaded into the highest performance storage while another portion of the database object descriptions may be loaded into the highest available performance storage. This highest available performance has a performance level lower than the highest performance level storage. The execution order for the workgroups determines which ones of the database object descriptions are placed into the highest performance storage and which database object descriptions are placed into the highest available performance storage after the highest performance storage.

Figure 10:
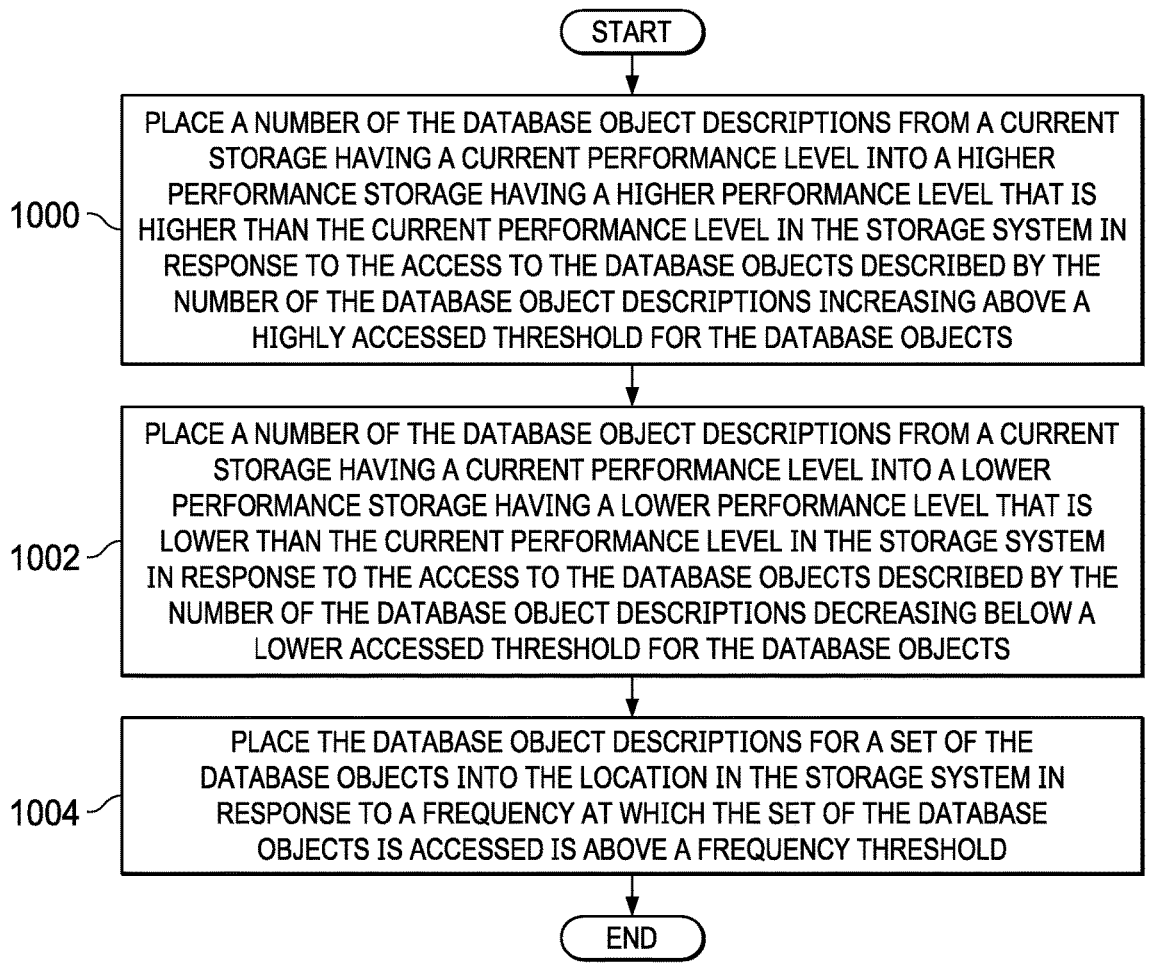
FIG. 10 is a flowchart of a process for managing the location of system database object descriptions in a storage in accordance with an illustrative embodiment.

Turning to FIG. 10, a flowchart of a process for managing the location of system database object descriptions in a storage is depicted in accordance with an illustrative embodiment. The process in FIG. 10 is an example of an implementation for step 804 in FIG. 8.

The process places a number of the database object descriptions from a current storage having a current performance level into a higher performance storage having a higher performance level that is higher than the current performance level in the storage system in response to the access to the database objects described by the number of the database object descriptions increasing above a highly accessed threshold for the database objects (step 1000). The process places a number of the database object descriptions from a current storage having a current performance level into a lower performance storage having a lower performance level that is lower than the current performance level in the storage system in response to the access to the database objects described by the number of the database object descriptions decreasing below a lower accessed threshold for the database objects (step 1002).

The process places the database object descriptions for a set of the database objects into the location in the storage system in response to a frequency at which the set of the database objects is accessed is above a frequency threshold (step 1004). The process terminates thereafter.

Figure 11:
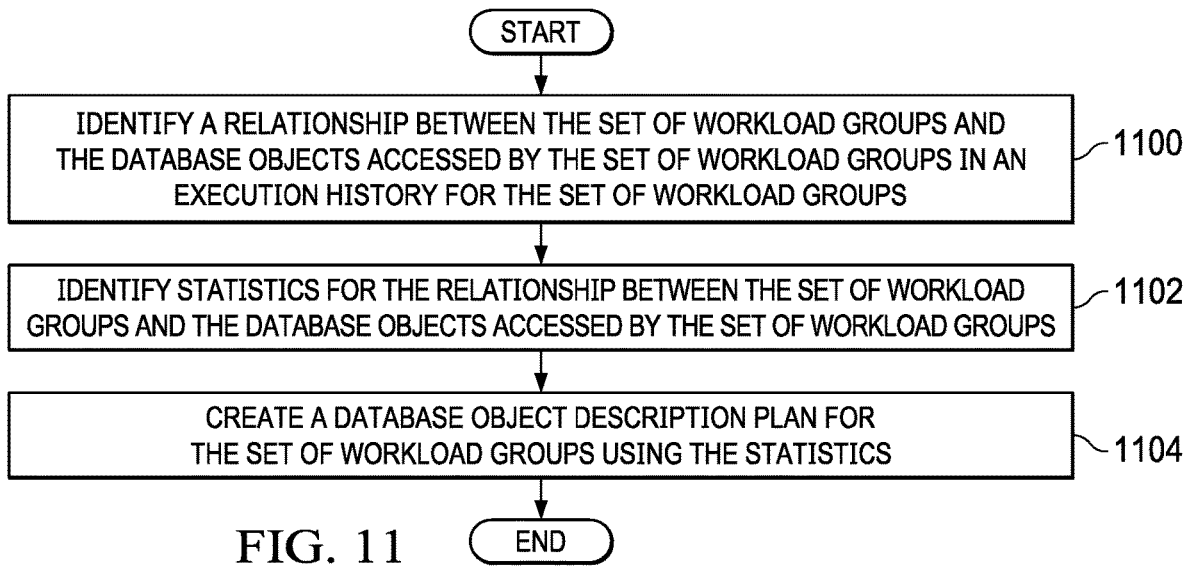
FIG. 11 is a flowchart of a process for managing the location of system database object descriptions in a storage in accordance with an illustrative embodiment.

Turning to FIG. 11, a flowchart of a process for managing the location of system database object descriptions in a storage is depicted in accordance with an illustrative embodiment. The process in FIG. 11 is an example of additional steps that can be performed with the process in FIG. 8.

The process identifies identifying a relationship between the set of workload groups and the database objects accessed by the set of workload groups in an execution history for the set of workload groups (step 1100). In step 1100, a relationship between the workload groups in the database objects can be determined that a number of different ways. For example, a statistical analysis or regression analysis can be performed. In another illustrative example, the execution history can be used to train a machine learning model to identify relationships between workload groups and database objects.

The process identifies statistics for the relationship between the set of workload groups and the database objects accessed by the set of workload groups (step 1102). In step 1102, the statistics can include trends or patterns that can be used to predict future execution of workload groups and access to database objects.

The process creates a database object description plan for the set of workload groups using the statistics (step 1104). The process terminates thereafter. In step 1104, the database object description plan comprises rules for placing database object descriptions in storage locations having different levels of performance such that a database system in which the workload groups are executed has increased performance. This database object description plan includes rules for space in the storage system for database object descriptions. The database object description plan can include rules for preloading database description objects based on time such when particular workgroups are predicted to execute.

Further, the database object description plan can also include rules triggered by the order of execution of workload groups in which particular workloads and workload group execute any particular order. The loading and management of the location for database object descriptions can be managed using the rules based on execution order. Additionally, the database object description plan can also include rules for unloading or managing the location of database object descriptions based on the frequency at which database objects are accessed.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 12:
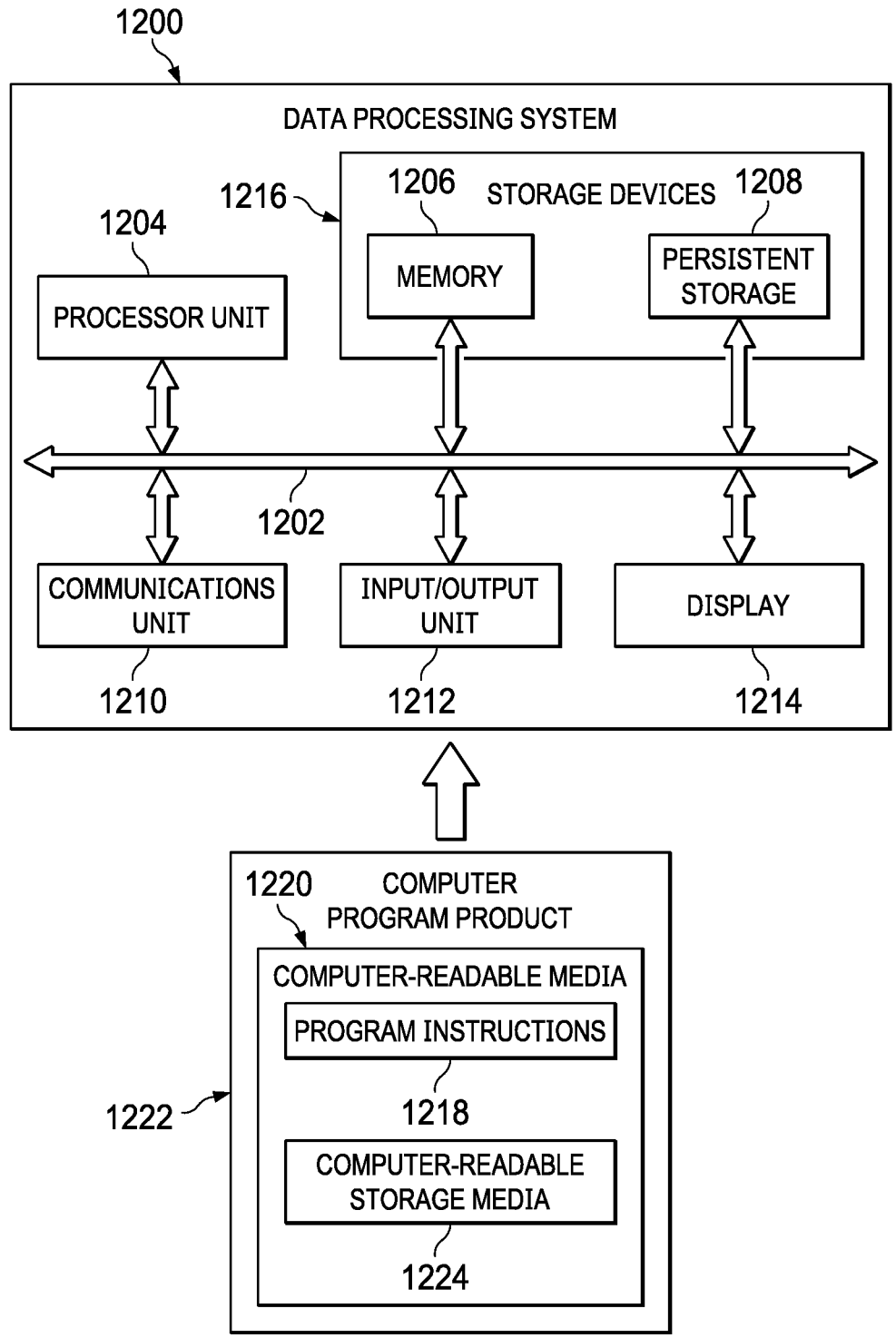
FIG. 12 is a block diagram of a data processing system in accordance with an illustrative embodiment.

Turning now to FIG. 12, a block diagram of a data processing system is depicted in accordance with an illustrative embodiment. Data processing system 1200 can be used to implement server computer 104, server computer 106, client devices 110, in FIG. 1. Data processing system 1200 can also be used to implement computer system 204 in FIG. 2. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can may be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program instructions, computer usable program instructions, or computer-readable program instructions that can be read and executed by a processor in processor unit 1204. The program instructions in the different embodiments can be embodied on different physical or computer-readable storage media, such as memory 1206 or persistent storage 1208.

Program instructions 1218 is located in a functional form on computer-readable media 1220 that is selectively removable and can be loaded onto or transferred to data processing system 1200 for execution by processor unit 1204. Program instructions 1218 and computer-readable media 1220 form computer program product 1222 in these illustrative examples. In the illustrative example, computer-readable media 1220 is computer-readable storage media 1224.

Computer-readable storage media 1224 is a physical or tangible storage device used to store program instructions 1218 rather than a medium that propagates or transmits program instructions 1218. Computer-readable storage media 1224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1218 can be transferred to data processing system 1200 using a computer-readable signal media. The computer-readable signal media are signals and can be, for example, a propagated data signal containing program instructions 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1220" can be singular or plural. For example, program instructions 1218 can be located in computer-readable media 1220 in the form of a single storage device or system. In another example, program instructions 1218 can be located in computer-readable media 1220 that is distributed in multiple data processing systems. In other words, some instructions in program instructions 1218 can be located in one data processing system while other instructions in program instructions 1218 can be located in one data processing system. For example, a portion of program instructions 1218 can be located in computer-readable media 1220 in a server computer while another portion of program instructions 1218 can be located in computer-readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, may be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program instructions 1218.

Thus, illustrative embodiments of the present invention provide a computer implemented method, computer system, and computer program product for managing database object descriptions for a database. In one illustrative example, a computer implemented method manages a location of database object descriptions in a storage, the computer implemented method. A number of processor units identifies a set of workload groups that are coming up for execution. The number of processor units loads the database object descriptions for the set of workload groups into a highest performance storage in a storage system. The number of processor units manages the location of the database object descriptions in the storage system based on access to database objects by set of workload groups. In other illustrative examples, a computer system and a computer program product for managing a location of database object descriptions in a storage are provided. As a result, the illustrative embodiments can provide a technical effect of increasing the performance in accessing information in a database by dynamically managing the storage location of database object descriptors for database objects in a database.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing a location of database object descriptions in a storage system, the computer implemented method comprising:
    identifying, by a number of processor units, a set of workload groups that are coming up for execution, wherein each workload group comprises one or more workloads that generate database requests accessing a plurality of database objects;
    initially loading at least one subset of the database object descriptions for the set of workload groups into a higher performance storage than a current storage for the database object descriptions in the storage system before executing any workload from the set of workload groups based on anticipated workload needs prior to execution, by the number of processor units;
    analyzing, by the number of processor units, an execution history for the set of workload groups to identify relationships between the set of workload groups and the plurality of database objects accessed by the set of workload groups;
    generating, by the number of processor units, a plurality of database object description plans for the set of workload groups based on the identified relationships, wherein each database object description plan specifies rules for loading the database object descriptions into storage locations having different performance levels; and
    loading, by the number of processor units during runtime operation, the at least one subset of the database object descriptions into storage locations in the storage system based on runtime access to the plurality of database objects by the set of workload groups indicated by the specified rules.

2. The computer implemented method of claim 1, wherein the initially loading further comprising:
    initially loading before executing the any workload from the set of workload groups, by the number of processor units, the at least one subset of the database object descriptions into the higher performance storage in the storage system based on an execution order for the set of workload groups that are coming up for execution.

3. The computer implemented method of claim 1, further comprising:
    loading, by the number of processor units during runtime operation, the at least one subset of the database object descriptions into storage locations in the storage system based on the runtime access to the plurality of database objects and space limits in the storage system.

4. The computer implemented method of claim 1, further comprising:
    loading, by the number of processor units during runtime operation, the at least one subset of the database object descriptions from a runtime current storage having a runtime current performance level into a runtime higher performance storage having a runtime higher performance level that is higher than the runtime current performance level in the storage system in response to runtime access to a subset of the plurality of database objects described by the at least one subset of the database object descriptions increasing above a highly accessed threshold for the subset of the plurality of database objects.

5. The computer implemented method of claim 1, further comprising:
    loading, by the number of processor units during runtime operation, the at least one subset of the database object descriptions from a runtime current storage having a runtime current performance level into a runtime lower performance storage having a runtime lower performance level that is lower than the runtime current performance level in the storage system in response to runtime access to a subset of the plurality of database objects described by the at least one subset of the database object descriptions decreasing below a lower accessed threshold for the subset of the plurality of database objects.

6. The computer implemented method of claim 1, further comprising:
    maintaining, by the number of processor units, a linked list structure to track loading and removal of the database object descriptions in the storage system;
    determining, by the number of processor units when storage space is needed in the storage system, which database object descriptions to remove based on their position in the linked list; and
    removing, by the number of processor units, a database object description from an end of the linked list first when additional storage space is needed for loading new database object descriptions.

7. The computer implemented method of claim 1, wherein the specified rules in the database object description plans include time-based rules that trigger automatic loading of specific database object descriptions based on predefined time windows, wherein different subsets of the database object descriptions are loaded into a runtime higher performance storage during different time windows.

8. A computer system for managing a location of database object descriptions comprising:
    a number of processor units, wherein the number of processor units executes program instructions to:
        identify a set of workload groups that are coming up for execution, wherein each workload group comprises one or more workloads that generate database requests accessing a plurality of database objects;
        initially load at least one subset of the database object descriptions for the set of workload groups into a higher performance storage than a current storage for the database object descriptions in a storage system before executing any workload from the set of workload groups based on anticipated workload needs prior to execution;
        analyze, by the number of processor units, an execution history for the set of work load groups to identify a relationship between the workload groups and database objects accessed by the workload groups;

generate, by the number of processor units, a plurality of database object description plans for the set of workload groups based on the identified relationships, wherein each database object description plan specifies rules for loading the database object descriptions into storage locations having different performance levels; and load during runtime operation the at least one subset of the database object descriptions into storage locations in the storage system based on runtime access to the plurality of database objects by the set of workload groups indicated by the specified rules.

9. The computer system of claim 8, wherein the number of processor units executes program instructions to:
initially load the at least one subset of the database object descriptions into a highest available performance storage in the storage system based on an execution order for the set of workload groups that are coming up for execution before executing any workload from the set of workload groups.

10. The computer system of claim 8, wherein the number of processor units executes program instructions to:
load during runtime operation at least one subset of the database object descriptions into storage locations in the storage system based on the runtime access to the plurality of database objects and space limits in the storage system.

11. The computer system of claim 8, wherein the number of processor units executes program instructions to:
load during runtime operation at least one subset of the database object descriptions from a runtime current storage having a runtime current performance level into a runtime higher performance storage having a runtime higher performance level that is higher than the runtime current performance level in the storage system in response to runtime access to a subset of the plurality of database objects described by the at least one subset of the database object descriptions increasing above a highly accessed threshold for the subset of the plurality of database objects.

12. The computer system of claim 8, wherein the number of processor units executes program instructions to:
load during runtime operation the at least one subset of the database object descriptions from a runtime current storage having a runtime current performance level into a runtime lower performance storage having a lower performance level that is lower than the runtime current performance level in the storage system in response to runtime access to a subset of the plurality of database objects described by the at least one subset of the database object descriptions decreasing below a lower accessed threshold for subset of the plurality of database objects.

13. The computer system of claim 8, wherein the plurality of database object description plans include frequency-based rules that automatically place database object descriptions into a runtime highest performance storage when their corresponding database objects are accessed at a frequency that exceeds a predefined frequency threshold, wherein the frequency threshold is configurable based on available storage space in the runtime highest performance storage.

14. The computer system of claim 8, wherein the number of processor units executes program instructions to:
monitor, during runtime operation, patterns of workload execution and database object access over time along a timeline;

analyze the monitored patterns to identify trends in database object access by the set of workload groups;
update the plurality of database object description plans based on the identified trends; and
adapt the loading of the at least one subset of the database object descriptions based on the updated database object description plans to improve future database performance.

15. A computer program product for managing a location of database object descriptions in a storage, the computer program product comprising a computer readable storage medium having program instructions embodied therewith, the program instructions executable by a computer system to cause the computer system to perform a method of:
identifying, by a number of processor units, a set of workload groups that are coming up for execution, wherein each workload group comprises one or more workloads that generate database requests accessing a plurality of database objects;
initially loading, by the number of processor units, at least one subset of the database object descriptions for the set of workload groups into a higher performance storage than a current storage for the database object descriptions in a storage system before executing any workload from the set of workload groups based on anticipated workload needs prior to execution;
analyzing, by the number of processor units, an execution history for the set of workload groups to identify relationships between the set of workload groups and the plurality of database objects accessed by the set of workload groups;
generating, by the number of processor units, a plurality of database object description plans for the set of workload groups based on the identified relationships, wherein each database object description plan specifies rules for loading the database object descriptions into storage locations having different performance levels; and
loading, by the number of processor units during runtime operation, the at least one of the database object descriptions into storage locations in the storage system based on runtime access to the plurality of database objects by the set of workload groups indicated by the specified rules.

16. The computer program product of claim 15, wherein the initially loading further comprising:
initially loading before executing the any workload from the set of workload groups, by the number of processor units, the at least one subset of the database object descriptions into a highest available performance storage in the storage system based on an execution order for the set of workload groups that are coming up for execution.

17. The computer program product of claim 15, further comprising:
loading, by the number of processor units during runtime operation, the at least one subset of the database object descriptions in the storage system based on the runtime access to the plurality of database objects and space limits in the storage system.

18. The computer program product of claim 15, further comprising:
loading, by the number of processor units during runtime operation, the at least one subset of the database object descriptions from a runtime current storage having a runtime current performance level into a runtime higher performance storage having a runtime higher performance level that is higher than the runtime current performance level in the storage system in response to runtime access to a subset of the plurality of database objects described by the at least one subset of the database object descriptions increasing above a highly accessed threshold for the subset of the plurality of database objects.

19. The computer program product of claim 15, further comprising:

loading, by the number of processor units during runtime operation, the at least one subset of the database object descriptions from a runtime current storage having a runtime current performance level into a runtime lower performance storage having a runtime lower performance level that is lower than the runtime current performance level in the storage system in response to runtime access to a subset of the plurality of database objects described by the at least one subset of the database object descriptions decreasing below a lower accessed threshold for the subset of the plurality of database objects.

20. The computer program product of claim 15, further comprising:

loading, by the number of processor units during runtime operation, the at least one subset of the database object descriptions for a set of the plurality of database objects into a location in the storage system in response to a frequency at which the set of the plurality of database objects is accessed is above a frequency threshold.

\* \* \* \* \*